Patented May 18, 1954

2,678,882

UNITED STATES PATENT OFFICE 2,678,882

AROMATIC SULFONYL HALIDE COUPLERS FOR COLOR PHOTOGRAPHY

Charles R. Barr, Ilmari F. Salminen, and Arnold Weissberger, Rochester, N. Y., assignors to Eastman Kodak Company, Rochester, N. Y., a corporation of New Jersey No Drawing. Application January 23, 1952, Serial No. 267,936

26 Claims. (Cl. 95—6)

This invention relates to coupler compounds for color photography containing sulfonyl halide groups and more particularly to coupler compounds prepared from a sulfonylphthalic anhydride and a sulfonylnaphthalic anhydride.

In color photograph it is conventional to form dye images in silver halide emulsion layers by exposing the emulsion layer and developing it with a primary aromatic amino developing agent in the presence of a color-forming coupler compound, such as a pyrazolone or naphthol compound. In this process the coupler compound may be initially present in the emulsion layer or only in the developing solution. In the former case it is particularly desirable to incorporate into the coupler molecule solubilizing groups such as carboxyl or sulfonic acid groups to facilitate incorporating the coupler into the emulsion as a soluble salt. These and other groups are also provided to regulate the diffusion of the coupler in the emulsion layer of the multilayer color film. Similarly, the carboxyl and sulfo groups facilitate incorporation of the coupler compounds into alkaline color developing solutions.

We have discovered that couplers prepared from the anhydrides 3-chlorosulfonylnaphthalic anhydride and 4-chlorosulfonylphthalic anhydride by reaction of the anhydrides with coupler compounds containing free amino groups, are particularly valuable for the mentioned uses in emulsion layers and in color developing solutions.

The coupler compounds of the invention have the following general formulas:

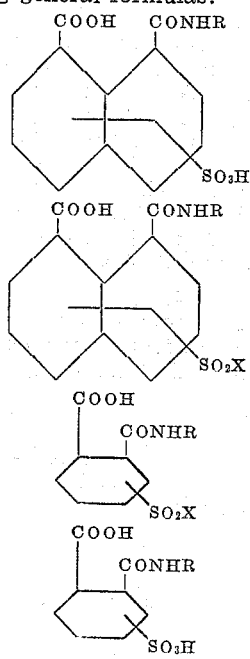

wherein R in each case represents a group of atoms containing a coupler group free to react with a primary aromatic amino silver halide developing agent to form a dye image in the region of exposure of a silver halide emulsion layer and X represents a halogen atom. Typical coupler groups contained in R are phenolic hydroxyl groups containing a position free to react with the color developing agent to form a dye, reactive methylene groups such as 5-pyrazolone groups containing a reactive 4-position and the open chain group —CO—CH$_2$—CO— e. g. a benzoyl acetamino group.

As mentioned, the coupler compounds of the invention are prepared by reaction of the aromatic carboxylic anhydrides containing sulfonyl halide groups, with coupler amines. Thus in the case of 4-cholorsulfonylphthalic anhydride, the reaction appears to take place as follows:

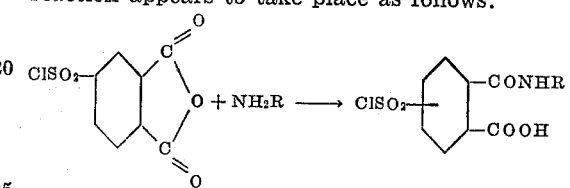

Accordingly, as is also the case with 3-chlorosulfonylnaphthalic anhydride, it is apparent that only equal molecular parts of the reactants are required. In those cases where couplers are desired having the structure

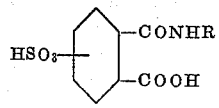

it is not necessary to start with 4-sulfophthalic anhydride and use more than one mol of coupler amine with the concomitant waste of coupler amine when the resulting salt is neutralized. Similarly, when the sulfonaphthalic acid amide couplers are desired, it is not necessary to employ substantially more than equal parts of the reactants and the sulfo compound is merely obtained by hydrolyzing the sulfonyl halide group of the compounds of the invention.

The above reaction of equal molecular proportions of coupler amine and chlorosulfonylphthalic anhydride and chlorosulfonylnaphthalic anhydride is unexpected since the most pertinent literature indicates that it might be expected that the reaction would take place at the sulfonyl halide group. For example, Reé, Annalen 233, 228 indicates that ammonia reacts with sulfophthalic acid to form the sulfonamide. Similarly, Chemical Abstracts 23, 2435 indicates that ammonia reacts with 3-chlorosulfonyl-1,8-naphthalic anhydride to yield 3-amidosulfonaphthal imide rather than a chlorosulfonylnaphthoic acid amide as in the present invention.

Aside from the ease of preparation of the coupler compounds of the invention, the coupler compounds are outstanding since the presence of the sulfonyl halide group on the coupler molecular appears to greatly decrease diffusion of the couplers in gelatin emulsion layers possibly by reacting with basic groups in the gelatin molecule.

The preparation of representative coupler compounds of the invention is illustrated by the following examples:

EXAMPLE I

α-(o-Methoxybenzoyl)-4-[5 - (2-carboxy-x-chlorosulfonylbenzamido)-2-(2,4 - di - tert.-amylphenoxy)benzamido]-2-methoxyacetanilide

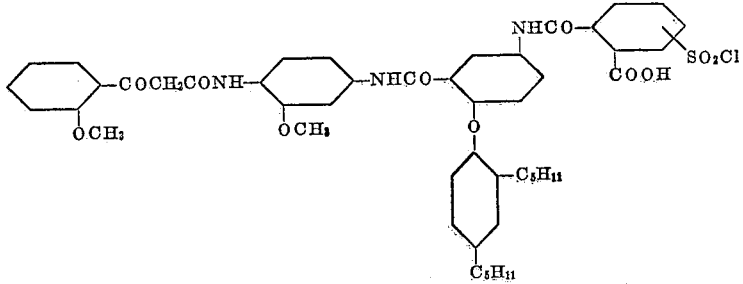

*4-chlorosulfonylphthalic anhydride*

A solution of one part of 4-chlorosulfonylphthalic acid in nine volumes of thionyl chloride is heated under a reflux condenser for 2½ hours. The solution is concentrated at reduced pressure to a glassy product, which crystallizes on storage in a closed vessel. The anhydride is crystallized from one volume of chloroform; M. P. 88–90°. Calcd. for $C_8H_3O_5ClS$: C, 39.0; H, 1.22; Cl, 14.4. Found: C, 38.8; H, 1.4; Cl, 14.4.

A coupler amine is obtained as follows: α-2-methoxybenzoyl-4-amino-2 - methoxyacetanilide is reacted with 2-(2',4'-di-tert. amylphenoxy)5-nitrobenzoyl chloride to obtain the amide containing a nitro group. The amide is then reduced with hydrogen over Raney nickel to yield the corresponding amino benzanilide. The desired coupler is then obtained as follows:

To a hot solution of two and one-half parts (one equivalent) of the amino benzanilide in 50 volumes benzene is added one part (one equivalent) of the chlorosulfonylphthalic anhydride in 50 volumes benzene. The mixture forms a clear yellow solution which is left standing overnight. The clear reaction mixture is diluted with 50 volumes of petroleum ether and the product, which separates, is filtered and dried.

EXAMPLE II 1-phenyl-3-{3 - [5-(2-carboxy-x-chlorosulfonylbenzamido)-2-(2,4-di - tert. - amylphenoxy)-benzamido]benzamido}-5-pyrazolone

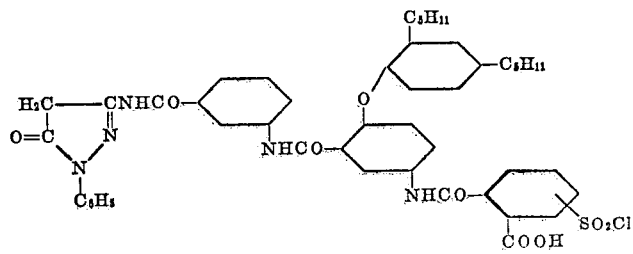

1-phenyl-3-amino-5-pyrazolone is reacted with m-nitrobenzoyl chloride and the resultant nitrobenzamide reduced at the nitro group with hydrogen over Raney nickel. The resultant aminobenzamide is then reacted with 2-(2',4'-di-tert. amylphenoxy)-5-nitrobenzoyl chloride and the resultant nitrobenzamide compound reduced at the nitro group with hydrogen over Raney nickel catalyst to yield the amino pyrazolone compound.

The desired coupler is then obtained as follows:

To a hot suspension of three parts (one equivalent) of the amino pyrazolone in 75 volumes of benzene is added a solution of one part (one equivalent) of the chlorosulfonylphthalic anhydride in 50 volumes of benzene with stirring. In approximately 15 minutes the product separates as an oil and soon solidifies to a light yellow solid.

EXAMPLE III 1-hydroxy-N-{4-[5-(2-carboxy - x - chlorosulfonylbenzamido)-2-(2,4-di-tert. - amylphenoxy)-benzamido] phenethyl}-4-chloro-2-naphthamide

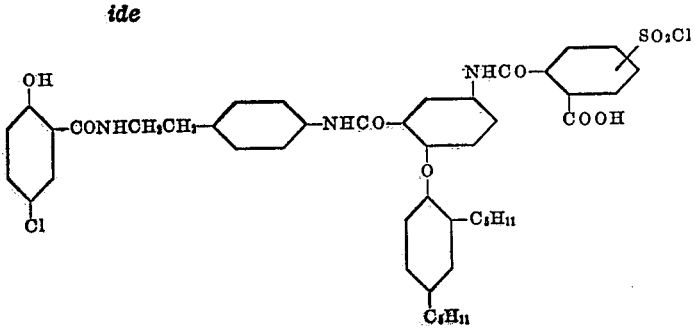

p-(Aminoethyl) aniline is condensed with 1-hydroxy-4-chloro-2-naphthoyl chloride and the resultant naphthamide 1-hydroxy-N-(4-aminophenethyl)-4-chloro-2-naphthamide is treated with 2-(2,4 - di-tert.-amylphenoxy)-5-nitrobenzoyl chloride in the presence of acetic acid and sodium acetate. The resultant nitro compound is then reduced with hydrogen over Raney nickel catalyst to yield an amino naphthamide. The desired coupler compound is obtained as follows:

To a solution of three parts (one equivalent) of the amino naphthamide, in 50 volumes hot benzene is added a solution of one part (one equivalent) of 4-chlorosulfonylphthalic anhydride in 50 volumes of benzene. The reaction mixture forms a clear coupler solution, and after approximately 2½ hours a white crystalline solid begins to separate. After four hours the white product is filtered and dried.

EXAMPLE IV

*1-[4-(8-carboxy-x-chlorosulfonylnaphthamido)-phenyl]- 3 -(8-carboxy-x-chlorosulfonylnaphthamido)-5-pyrazolone*

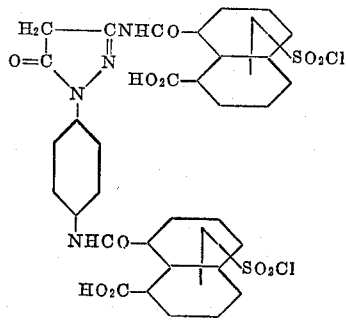

1 - p-aminophenyl-3-amino-5-pyrazolone prepared by reduction of 1-p-nitrophenyl-3-amino-5-pyrazolone (U. S. Patent 2,376,380) is reacted with 3-chlorosulfonylnaphthalic anhydride as follows:

To a hot solution of one part (one equivalent) of the pyrazolone in 100 volumes of dioxane is added a suspension of three parts (one equivalent) of the anhydride in 50 volumes of dioxane. This forms a clear solution which is left standing overnight. To this solution is added 200 volumes of petroleum ether, the product separating as tan needles.

EXAMPLE V

*1 - hydroxy - N - {4 - [5 - (8 - carboxy - x - chlorosulfonylnaphthamido) - 2 - (2,4 - di - tert. amylphenoxy)benzamido]phenethyl} - 4 - chloro-2-naphthamide*

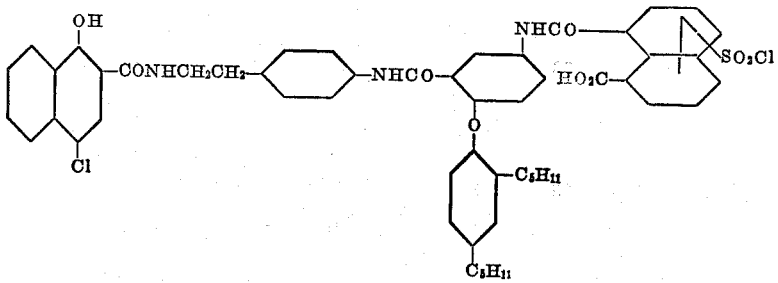

The amino naphthamide coupler produced as in Example III is reacted with 3-chlorosulfonylnaphthalic anhydride as follows:

To a hot suspension of three parts (one equivalent) of the amino naphthamide in 50 volumes of benzene is added one part (one equivalent) of chlorosulfonylnaphthalic anhydride suspended in 100 volumes of hot benzene. This reaction mixture is refluxed for one hour, cooled and filtered.

Other typical amino pyrazolones which may be reacted with 4-chlorosulfonylphthalic anhydride and 3-chlorosulfonyl-1,8-naphthalic anhydride in the manner of the above examples are the following:

1 - p - aminophenyl - ) (3 - p - tert. amyl phenoxy) benzamido-5-pyrazolone
3-amino-5-pyrazolone
1-phenyl-3-amino-5-pyrazolone
1-p-nitrophenyl-3-amino-5-pyrazolone
1(2'-benzothiazolyl)-3-amino-5-pyrazolone
o-aminophenol
p-aminophenol
2-amino-1-naphthol
1-p-aminophenyl-3(2,4-di-tert. amyl) phenoxyacetamido-5-pyrazolone
1 - (2,4,6 - trichlorophenyl) - 3 - amino - 5 - pyrazolone
1 - p - tert. butylphenoxyphenyl - 3 - amino - 5-pyrazolone
1 - phenoxyphenyl - 3 - amino - 5 - pyrazolone
1 - m - methylphenyl - 3 - amino - 5 - pyrazolone
1 - (3,5 - dimethylphenyl) - 3 - amino - 5 - pyrazolone
1 - o - chlorophenyl - 3 - amino - 5 - pyrazolone
1-methyl-3-amino-5-pyrazolone
1-ethyl-3-amino-5-pyrazolone
1 - o - sulfophenyl - 3 - amino - 5 - pyrazolone
1 - o - hydroxyphenyl - 3 - amino - 5 - pyrazolone The couplers of the above examples are incorporated into silver halide emulsion layers, or into color developing compositions containing a primary aromatic amino developing agent in addition to the usual addenda such as alkali, antifoggants, etc. When the exposed emulsions are developed with the color developing agents in the presence of the couplers containing the pyrazolone group, magenta dye images are obtained, those couplers having phenolic hydroxyl groups such as a naphthol group give cyan dye images and those containing the open chain reactive methylene group yield yellow dye images.

When incorporating the couplers into emulsions, the sulfonyl chloride group of the coupler is preferably hydrolyzed by treatment with alkali in alcohol solution by the methods of the Salminen et al. U. S. patent application Serial No. 774,890 published April 24, 1951. The hydrolyzed coupler compound now containing both free carboxyl and sulfo groups is then incorporated into the emulsion in the required quantity. The couplers may be used in emulsion layers containing gelatin or other water permeable colloid carriers such as albumin, collodion, organic esters of cellulose, or synthetic resins. The emulsion may be supported by transparent medium such as glass, a cellulose ester or synthetic resin or nontransparent medium such as paper or an opaque cellulose ester. The emulsion may be coated as a single layer or as superimposed layers on one or other sides of the support. The emulsion layers of a multilayer color film containing the couplers of the invention may be differently sensitized and may be sensitized either in the natural or false orders.

A typical color developer for use in developing emulsion layers containing the coupler compounds of the invention is as follows:

| | Grams |
|---|---|
| 2-amino-5-diethylaminotoluene sulfate | 2.5 |
| Sodium sulfite (anhydrous) | 5 |
| Sodium carbonate (anhydrous) | 20 |
| Potassium bromide | 2 |
| Water to 1000 cc. | |

While the coupler compounds of the invention are primarily intended for use in emulsion layers, they can be used in color developing compositions such as given above. The couplers are incorporated into the developer compositions by first dissolving in a solvent such as isopropyl alcohol and this solution is then added to the alkaline developer composition. About three grams of coupler are suitable for use in developer compositions such as the above.

What we claim is:

1. A photographic silver halide emulsion containing as a color-forming coupler a compound selected from the group consisting of those having the general formulas:

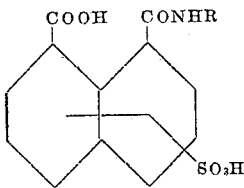

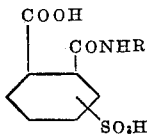

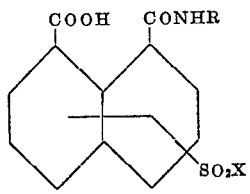

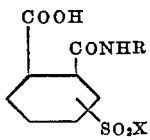

wherein R represents a coupler group free to react with a primary aromatic amino silver halide developing agent to form a dye and X represents a halogen atom.

2. A photographic silver halide emulsion containing as a color-forming coupler a compound having the general formula:

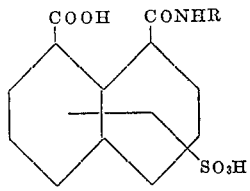

wherein R represents a coupler free to react with a primary aromatic amino silver halide developing agent to form a dye.

3. A photographic silver halide emulsion containing as a color-forming coupler a compound having the general formula:

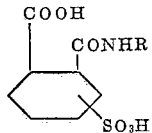

wherein R represents a coupler group free to react with a primary aromatic amino silver halide developing agent to form a dye.

4. A photographic silver halide emulsion containing as a color-forming coupler a compound having the general formula set forth in claim 2 wherein R represents a group of atoms containing a phenolic hydroxy group the aromatic nucleus of which contains a position free to react with a primary aromatic amino silver halide developing agent to form a dye.

5. A photographic silver halide emulsion containing as a color-forming coupler a compound having the general formula set forth in claim 2 wherein R represents a group of atoms containing a methylene group free to react with a primary aromatic amino silver halide developing agent to form a dye.

6. A photographic silver halide emulsion containing as a color-forming coupler a compound having the general formula set forth in claim 2 wherein R represents a group of atoms containing a 5-pyrazolone group the 4-position of which is free to react with a primary aromatic amino silver halide developing agent to form a dye.

7. A photographic silver halide emulsion containing as a color-forming coupler a compound having the general formula set forth in claim 2 wherein R represents a group of atoms containing a —CO—CH$_2$—CO— group.

8. A photographic silver halide emulsion containing as a color-forming coupler a compound having the general formula set forth in claim 3 wherein R represents a group of atoms containing a phenolic hydroxy group the aromatic nucleus of which contains a position free to react with a primary aromatic amino silver halide developing agent to form a dye.

9. A photographic silver halide emulsion containing as a color-forming coupler a compound having the general formula set forth in claim 3 wherein R represents a group of atoms containing a methylene group free to react with a primary aromatic amino silver halide developing agent to form a dye.

10. A photographic silver halide emulsion containing as a color-forming coupler a compound having the general formula set forth in claim 3 wherein R represents a group of atoms containing a 5-pyrazolone group the 4-position of which is free to react with a primary aromatic silver halide developing agent to form a dye.

11. A photographic silver halide emulsion containing as a color-forming coupler a compound having the general formula set forth in claim 3 wherein R represents a group of atoms containing a —CO—CH₂—CO— group.

12. A photographic silver halide emulsion containing as a color-forming coupler α-(o-methoxybenzoyl)-4-[5-(2 - carboxy-x-sulfobenzamido)-2-(2,4 - di-tert.-amylphenoxy)benzamido]-2-methoxy-acetanilide.

13. A photographic silver halide emulsion containing as a color-forming coupler 1-phenyl-3 - {3 - [5-(2-carboxy-x-sulfobenzamido)-2-(2,4-di-tert.-amylphenoxy)benzamido]benzamido}-5-pyrazolone.

14. A photographic silver halide emulsion containing as a color-forming coupler 1-hydroxy-N-{4-[5-(2-carboxy-x-sulfobenzamido)-2-(2,4 - di-tert. - amylphenoxy)benzamido]phenethyl} - 4 - chloro-2-naphthamide.

15. A photographic silver halide emulsion containing as a color-forming coupler 1-[4-(8-carboxy-x-chlorosulfonylnaphthamido)phenyl] - 3 - (8 - carboxy-x-sulfonaphthamido)-5-pyrazolone.

16. A photographic silver halide emulsion containing as a color-forming coupler 1-hydroxy-N-{4 - [5-(8-carboxy-x-sulfonaphthamido)-2-(2,4-di-tert. amylphenoxy)benzamido]phenethyl}-4-chloro-2-naphthamide.

17. A color-forming developer composition for developing dye images in silver halide emulsion layers, comprising a primary aromatic amino silver halide developing agent and as a color-forming coupler a compound selected from the group consisting of those having the general formula set forth in claim 2.

18. A color-forming developer composition for developing dye images in silver halide emulsion layers, comprising a primary aromatic amino silver halide developing agent and as a color-forming coupler a compound selected from the group consisting of those having the general formula set forth in claim 3.

19. The method of producing a colored photographic image in a silver halide emulsion layer which comprises exposing said layer and developing it with a primary aromatic amino silver halide developing agent in the presence of a coupler compound selected from those having the general formula set forth in claim 2.

20. The method of producing a colored photographic image in a silver halide emulsion layer which comprises exposing said layer and developing it with a primary aromatic amino silver halide developing agent in the presence of a coupler compound selected from those having the general formula set forth in claim 3.

21. A photographic silver halide emulsion containing as a color-forming coupler a compound having the general formula

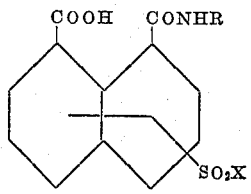

wherein R represents a coupler group free to react with a primary aromatic amino silver halide developing agent to form a dye and X represents a halogen atom.

22. A photographic silver halide emulsion containing as a color-forming coupler a compound having the general formula

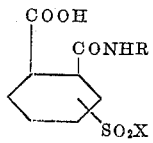

wherein R represents a coupler group free to react with a primary aromatic amino silver halide developing agent to form a dye and X represents a halogen atom.

23. A color-forming developer composition for developing dye images in silver halide emulsion layers, comprising a primary aromatic amino silver halide developing agent and as a color-forming coupler a compound selected from the group consisting of those having the general formula set forth in claim 21.

24. A color-forming developer composition for developing dye images in silver halide emulsion layers, comprising a primary aromatic amino silver halide developing agent and as a color-forming coupler a compound selected from the group consisting of those having the general formula set forth in claim 2.

25. The method of producing a colored photographic image in a silver halide emulsion layer which comprises exposing said layer and developing it with a primary aromatic amino silver halide developing agent in the presence of a coupler compound selected from those having the general formula set forth in claim 21.

26. The method of producing a colored photographic image in a silver halide emulsion layer which comprises exposing said layer and developing it with a primary aromatic amino silver halide developing agent in the presence of a coupler compound selected from those having the general formula set forth in claim 22.

References Cited in the file of this patent

UNITED STATES PATENTS

| Number | Name | Date |
|---|---|---|
| 2,168,183 | Wilmanns et al. | Aug. 1, 1939 |
| 2,186,719 | Frohlich et al. | Jan. 9, 1940 |
| 2,330,291 | Kirby | Sept. 28, 1943 |
| 2,498,466 | Thompson | Feb. 21, 1950 |

FOREIGN PATENTS

| Number | Country | Date |
|---|---|---|
| 105,618 | Australia | Oct. 25, 1938 |